(12) United States Patent
Kawazu et al.

(10) Patent No.: US 11,947,948 B2
(45) Date of Patent: Apr. 2, 2024

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventors: Ayuta Kawazu, Kanagawa (JP); Nobuhiro Tagashira, Chiba (JP); Takami Eguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 136 days.

(21) Appl. No.: 17/510,143

(22) Filed: Oct. 25, 2021

(65) Prior Publication Data
US 2022/0137953 A1 May 5, 2022

(30) Foreign Application Priority Data
Oct. 29, 2020 (JP) .................. 2020-181103

(51) Int. Cl.
*G06F 9/445* (2018.01)
*G06F 8/65* (2018.01)

(52) U.S. Cl.
CPC ...................... *G06F 8/65* (2013.01)

(58) Field of Classification Search
CPC .......... G06F 8/65; G06F 16/2379; G06F 8/61; G06F 8/71; G06F 8/60
USPC .................................. 717/168–178
See application file for complete search history.

(56) References Cited

U.S. PATENT DOCUMENTS

| | | | |
|---|---|---|---|
| 6,615,404 B1 * | 9/2003 | Garfunkel | G06F 8/654 717/173 |
| 9,880,908 B2 | 1/2018 | Jeansonne et al. | |
| 11,093,380 B1 * | 8/2021 | Lohchab | G06F 11/3664 |
| 2016/0092189 A1 * | 3/2016 | Pollack | G06F 9/546 717/175 |
| 2019/0050296 A1 * | 2/2019 | Luo | G06F 11/1415 |
| 2020/0351165 A1 * | 11/2020 | Guo | H04L 41/0895 |

* cited by examiner

*Primary Examiner* — Chuck O Kendall
(74) *Attorney, Agent, or Firm* — Canon U.S.A., Inc. IP Division

(57) ABSTRACT

An information processing apparatus stores first software and second software, the first software is stored in a first storage medium accessible by a central processing unit and an embedded controller, and the second software is used to restore the first software and stored in a second storage medium accessible by the embedded controller. The information processing apparatus includes an update unit configured to update the second software using the first software depending on a result of a comparison between version information about the first software and version information about the second software, a falsification detection unit configured to detect whether the first software is falsified; and a restoration unit configured to restore the first software using the second software in a case where the falsification detection unit detects that the first software is falsified.

15 Claims, 9 Drawing Sheets

FIG.3
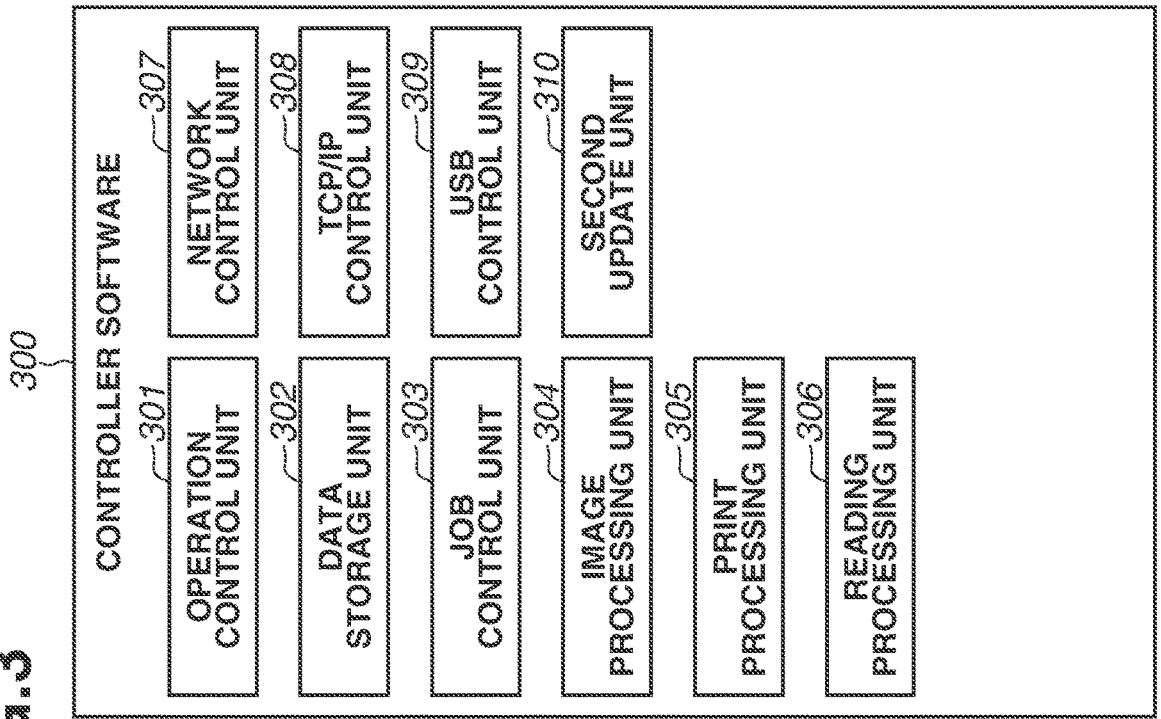
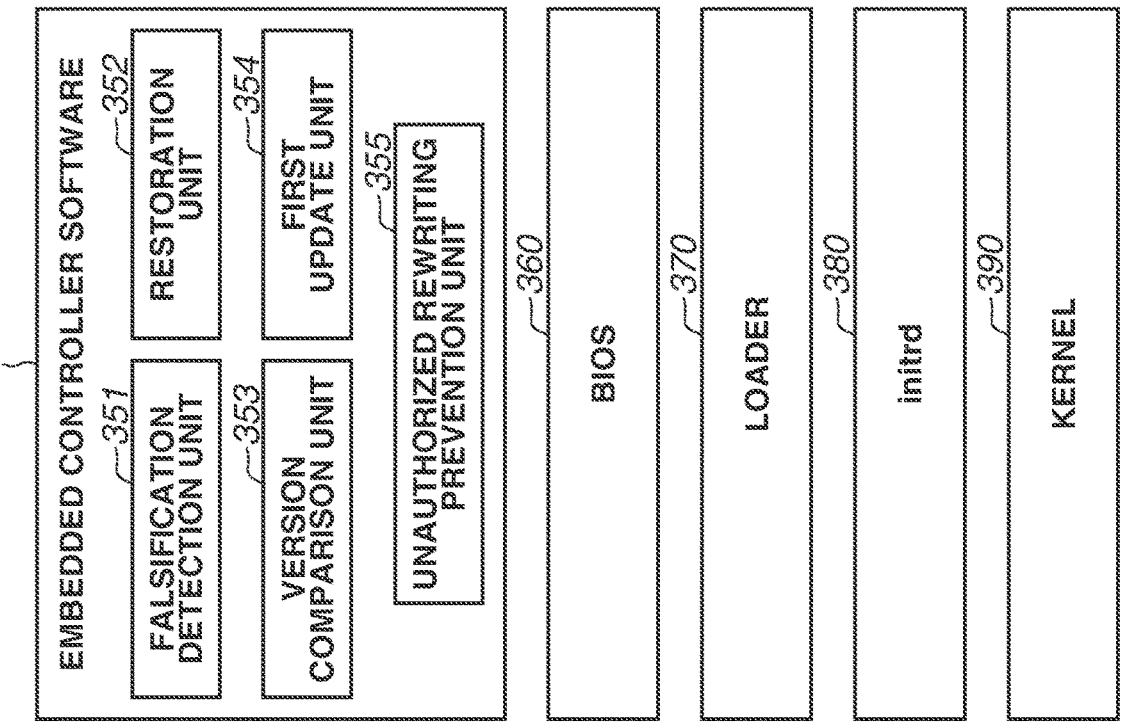

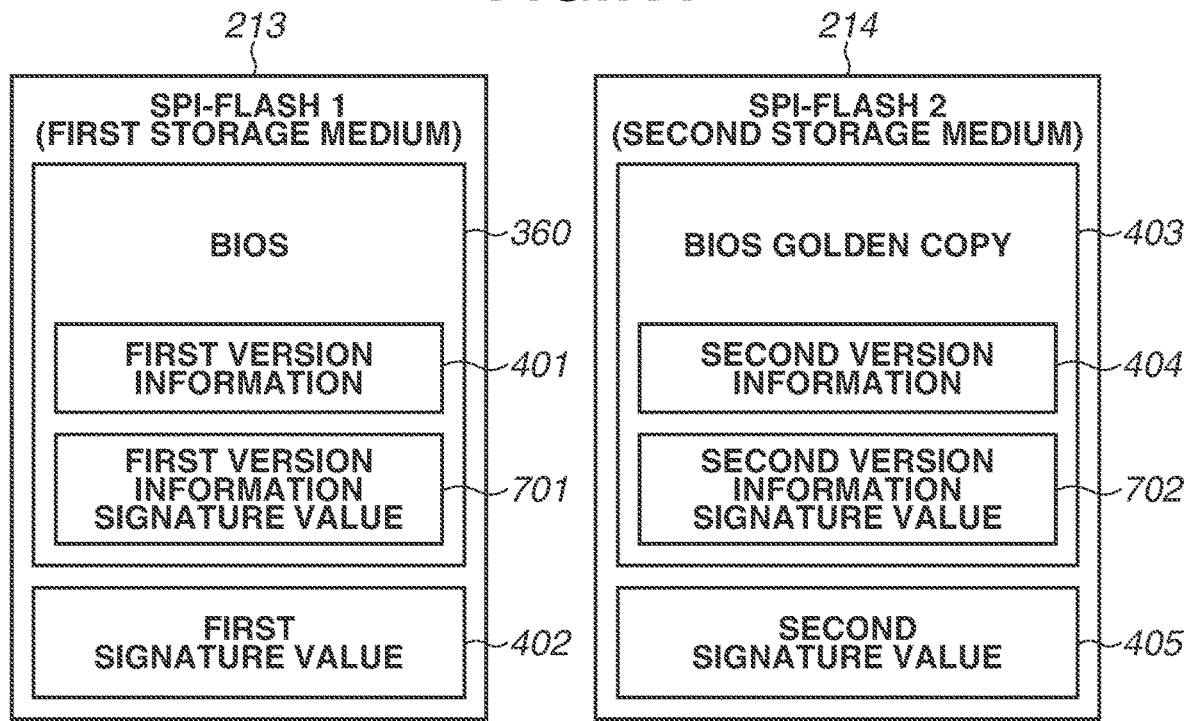
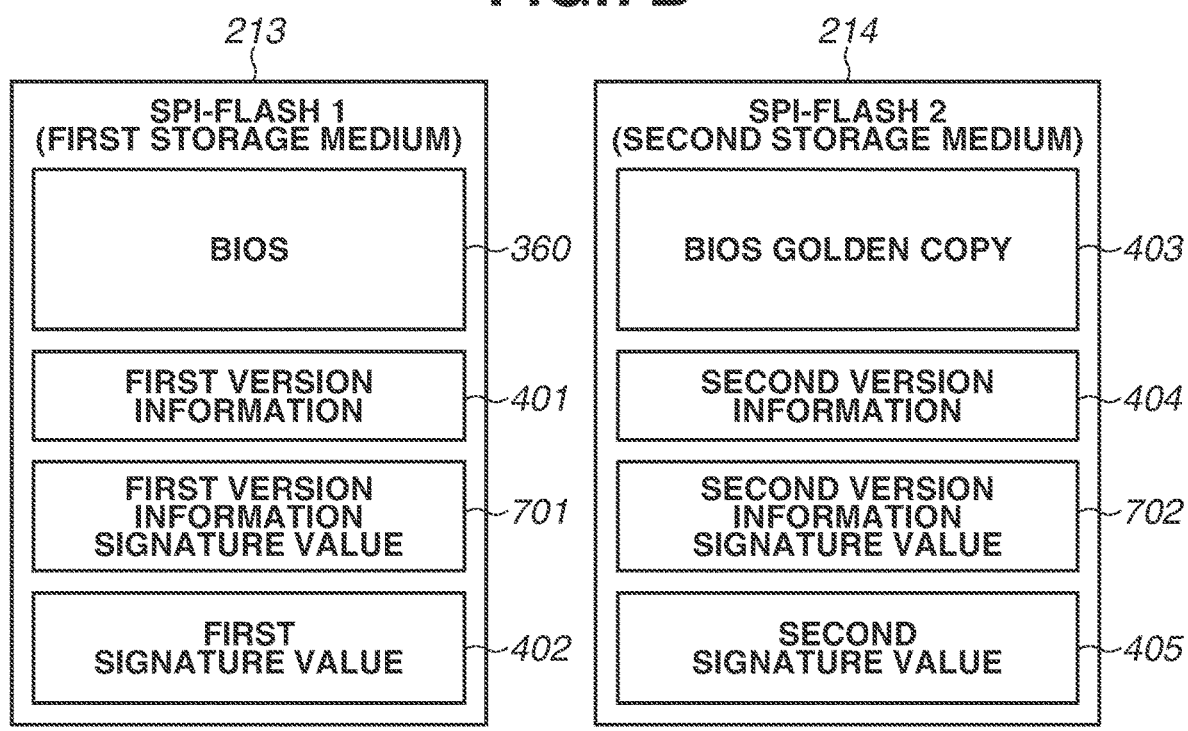

INFORMATION PROCESSING APPARATUS, INFORMATION PROCESSING METHOD, AND STORAGE MEDIUM

BACKGROUND

Field of the Disclosure

The present disclosure relates to an information processing apparatus, an information processing method, and a storage medium.

Description of the Related Art

There are attacks by third parties to falsify software that controls an information processing apparatus by an unauthorized method to steal an information asset in the information processing apparatus, and attacks to use the information processing apparatus including the falsified software as a springboard. In order to prevent such attacks, a method for verifying that the software in the information processing apparatus is not falsified by the third party is devised. Further, another devised method is a method for restoring the software when the falsification of this software is detected. A Basic Input Output System (BIOS) and a Unified Extensible Firmware Interface (UEFI) are software programs that start up the information processing apparatus first. Restoration methods for the BIOS and the UEFI are limited due to the unavailability of basic functions, such as the network function, partly because the BIOS and the UEFI are used at an initial stage of the startup. The BIOS may be called a boot code because being software pertaining to the startup of the information processing apparatus.

In U.S. Pat. No. 9,880,908, an embedded controller detects falsification of system firmware (a BIOS) stored in a first memory. If embedded controller determines that the system firmware is falsified, the embedded controller restores the system firmware by overwriting the system firmware stored in the first memory with system firmware for restoration (a BIOS golden copy) stored in a second memory in advance. This restoration processing brings the BIOS for a startup that is stored in the first memory back into a non-falsified state, thus enabling normal startup of the information processing apparatus. The bus configuration is designed in such a manner that the first memory is accessible from a central processing unit (CPU) but the second memory is accessible only by the embedded controller in order to prevent unauthorized rewriting of the BIOS golden copy.

In U.S. Pat. No. 9,880,908, the BIOS in the first memory and the BIOS golden copy in the second memory are controlled according to a policy in such a manner that they become the same. For example, in a case where the policy is set to permit the BIOS golden copy to be rewritten, hash values are compared between the BIOS in the first memory and the BIOS golden copy in the second memory. If the hash values are different, they are made to be the same by overwriting the BIOS golden copy in the second memory with the BIOS in the first memory.

As a known technique, there is a technique in which a CPU starts BIOS update data and updates the BIOS after an operation system (OS) is started.

However, U.S. Pat. No. 9,880,908 does not discuss a method of updating the BIOS golden copy. Even if the update of the BIOS golden copy is attempted by combining the BIOS update method according to the known technique with U.S. Pat. No. 9,880,908, the BIOS golden copy is not accessible from the CPU and therefore cannot be updated. The impossibility of the update leads to the BIOS golden copy kept outdated, which may cause the BIOS to be restored using an old version in which known vulnerability may remain.

If the policy is set to permit the BIOS golden copy to be rewritten in U.S. Pat. No. 9,880,908, the BIOS golden copy can be updated even in the technique in U.S. Pat. No. 9,880,908 by updating the BIOS using the known technique and restarting it. However, the BIOS golden copy is not necessarily updated to the latest version every time. For example, if the BIOS is rolled back (written back) to an old version, the restart undesirably causes the BIOS golden copy to be also rolled back to the old version. Further, in a case where the policy is set not to permit the BIOS golden copy to be rewritten, the updated BIOS is undesirably overwritten with the old BIOS golden copy to the contrary.

In the case of U.S. Pat. No. 9,880,908, the startup time increases (normally increases by approximately one second or so) because the processing of calculating and comparing the hash values of the BIOS and the BIOS golden copy is always performed to make both the BIOS and the BIOS golden copy the same.

SUMMARY

Embodiments of the present disclosure are directed to enabling an information processing apparatus to achieve both prevention of falsification of second software used to restore first software and a secure update of the second software.

According to embodiments of the present disclosure, an information processing apparatus stores first software and second software, the first software is stored in a first storage medium accessible by a central processing unit and an embedded controller, and the second software is used to restore the first software and stored in a second storage medium accessible by the embedded controller. The information processing apparatus includes an update unit configured to update the second software in the second storage medium using the first software in the first storage medium depending on a result of a comparison between version information about the first software and version information about the second software, a falsification detection unit configured to detect whether the first software is falsified, and a restoration unit configured to restore the first software using the second software in a case where the falsification detection unit detects that the first software is falsified.

Further features of the present disclosure will become apparent from the following description of exemplary embodiments with reference to the attached drawings.

BRIEF DESCRIPTION OF THE DRAWINGS

FIG. 3 is a block diagram illustrating an example of the configuration of software.

FIGS. 7A and 7B illustrate examples of the data stored in the SPI flash memories.

DESCRIPTION OF THE EMBODIMENTS

Exemplary embodiments of the present disclosure will be described below in detail with reference to the accompanying drawings. In the exemplary embodiments, a description will be provided of processing when an information processing apparatus updates a golden copy, which is software for restoration. The exemplary embodiments will be described citing a multi-function peripheral (MFP), which is an image forming apparatus, as an example of the information processing apparatus, but can also be applied to an information processing apparatus different from the multi-function peripheral. The present exemplary embodiments will be described citing a Basic Input Output System (BIOS) as an example of the software, but can also be applied to, for example, an update of a golden copy of firmware of a network interface card (NIC).

[Apparatus Configuration According to First Exemplary Embodiment]

Figure 1:
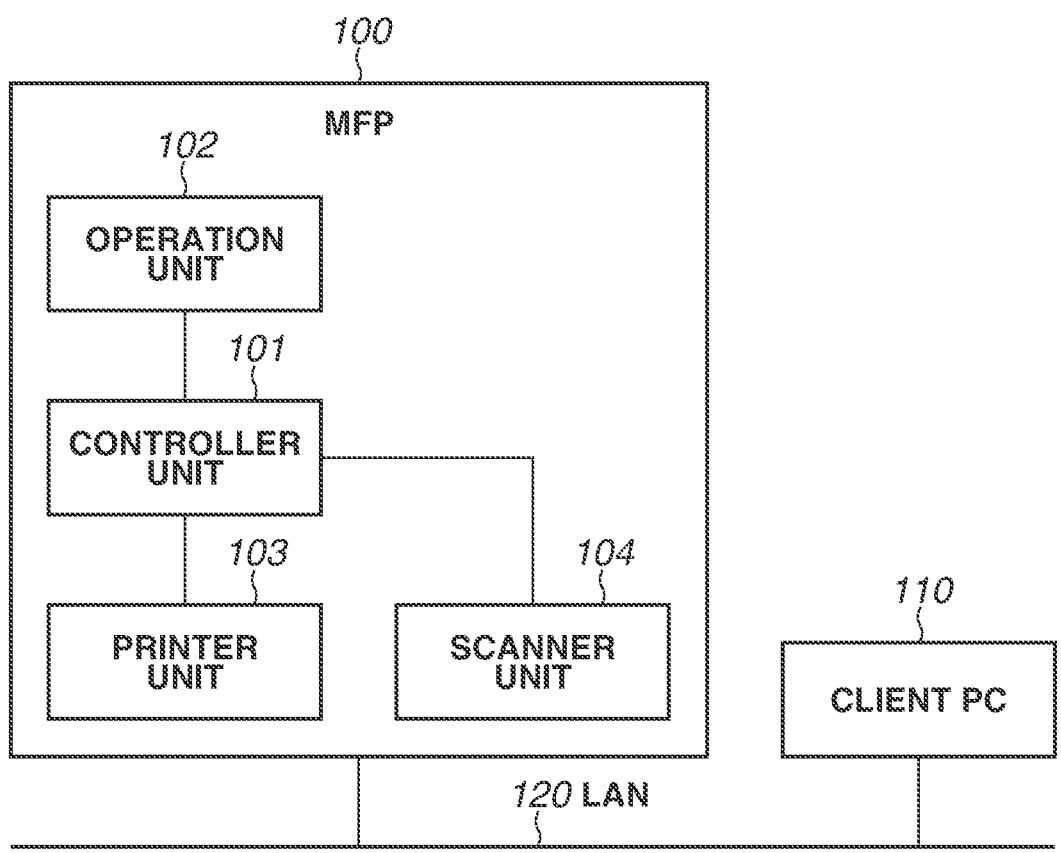
FIG. 1 is a block diagram illustrating an example of a connection between a multi-function peripheral (MFP) and a client personal computer (PC).

A first exemplary embodiment of the present disclosure will be described below. FIG. 1 is a block diagram illustrating an example of a connection between a multi-function peripheral (MFP) 100 and a client personal computer (PC) 110 according to a first exemplary embodiment. The MFP 100 is a multi-function peripheral, and is an example of the information processing apparatus. The client PC 110 is a client personal computer. The MFP 100 and the client PC 110 are connected via a local area network (LAN) 120. The MFP 100 includes an operation unit 102, which handles an input from and an output to a user. The MFP 100 includes a printer unit 103, which prints electronic data onto a paper medium. The MFP 100 includes a scanner unit 104, which reads a paper medium and converts it into electronic data. The MFP 100 includes a controller unit 101.

The operation unit 102, the printer unit 103, and the scanner unit 104 are connected to the controller unit 101, and realize functions as the multi-function peripheral under control of the controller unit 101. The client PC 110 performs processing of, for example, transmitting a print job to the MFP 100.

Figure 2:
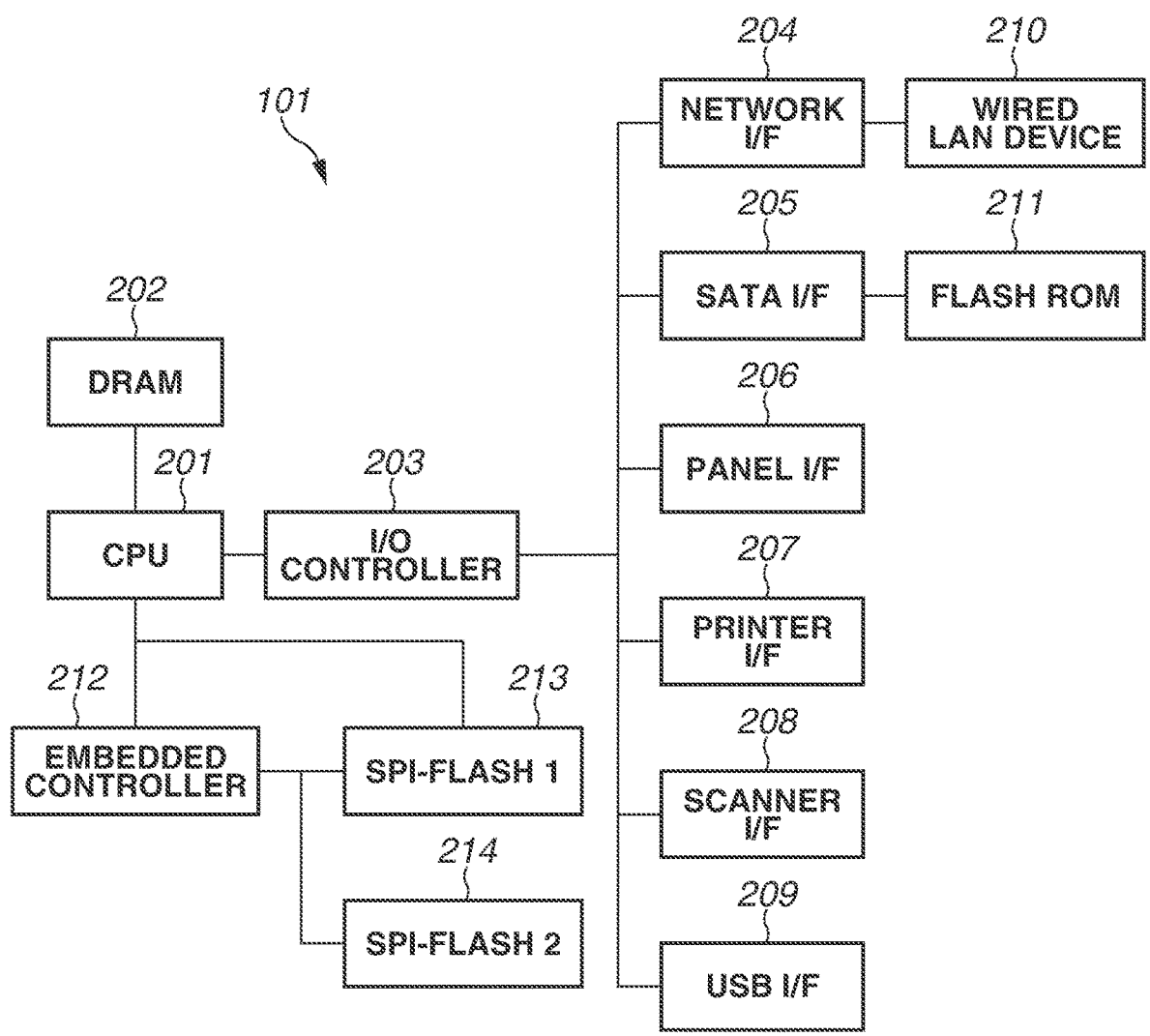
FIG. 2 illustrates an example of the configuration of a controller unit of the MFP.

FIG. 2 is a block diagram illustrating an example of the configuration of the controller unit 101 of the MFP 100. The controller unit 101 includes a central processing unit (CPU) 201, a dynamic random access memory (DRAM) 202, an input/output (I/O) controller 203, a network interface (I/F) 204, and a Serial Advanced Technology Attachment (SATA) OF 205. The controller unit 101 further includes a panel I/F 206, a printer IN 207, a scanner I/F 208, a Universal Serial Bus (USB) I/F 209, a wired LAN device 210, and a flash read only memory (ROM) 211. The controller unit 101 yet further includes an embedded controller 212, a first serial peripheral interface (SPI) flash memory 213, and a second SPI flash memory 214.

The CPU 201 performs main arithmetic processing in the controller unit 101. The CPU 201 is connected to the DRAM 202 via a bus. The DRAM 202 is used by the CPU 201 as a work memory for temporarily storing a program indicating arithmetic commands and data targeted for the processing in the course of an arithmetic operation performed by the CPU 201. The CPU 201 is connected to the I/O controller 203 via the bus. The I/O controller 203 handles inputs from and outputs to various kinds of devices according to an instruction from the CPU 201.

The SATA I/F 205 is connected to the I/O controller 203. The flash ROM 211 is connected to the SATA I/F 205. The flash ROM 211 permanently stores a program for realizing the functions of the MFP 100 and a document file therein.

The network I/F 204 is connected to the I/O controller 203. The wired LAN device 210 is connected to the network I/F 204. The CPU 201 realizes communication on the LAN 120 illustrated in FIG. 1 by controlling the wired LAN device 210 via the network I/F 204.

The panel I/F 206 is connected to the I/O controller 203. The CPU 201 realizes the input and the output to and from the operation unit 102 for the user illustrated in FIG. 1 via the panel I/F 206.

The printer I/F 207 is connected to the I/O controller 203. The CPU 201 realizes print processing onto a paper medium using the printer unit 103 illustrated in FIG. 1 via the printer I/F 207.

The scanner I/F 208 is connected to the I/O controller 203. The CPU 201 realizes processing of reading a document using the scanner unit 104 illustrated in FIG. 1 via the scanner I/F 208. The USB I/F 209 is connected to the I/O controller 203. The CPU 201 controls any device connected to the USB I/F 209.

The first SPI flash memory 213 is connected to the CPU 201 via the bus, and stores therein a BIOS 360, which will be described below with reference to FIGS. 3 and 4. The second SPI flash memory 214 stores therein a BIOS golden copy 403, which is a BIOS used to restore the BIOS 360, which will be described below with reference to FIG. 4. The present exemplary embodiment will be described citing the first SPI flash memory 213 as an example of a first storage medium and the second SPI flash memory 214 as an example of a second storage medium. However, the first and second storage media do not necessarily have to be the SPI flash memories, and may be embodied using another type of flash memories or storage media having a similar function.

The embedded controller 212 is a hardware chip which is started up first after a power switch of the MFP 100 is pressed. The embedded controller 212 performs processing of detecting falsification of the BIOS 360, restoring the BIOS 360 using the BIOS golden copy 403, and updating the BIOS golden copy 403, which will be described below. The embedded controller 212 is a micro controller that can operate independently of the CPU 201, and includes a CPU and a memory, such as a ROM and a RAM, therein separately and thus can perform arithmetic processing by itself.

The embedded controller 212 is connected to the first SPI flash memory 213, the second SPI flash memory 214, and the CPU 201 via the bus. After the completion of, for example, the processing of detecting the falsification of the BIOS 360 or updating the BIOS golden copy 403, the embedded controller 212 wakes up the CPU 201 by transmitting a reset signal to the CPU 201, and transfers the control thereto. After transferring the control to the CPU 201, the embedded controller 212 enters a sleep state.

In a case where a copy function is performed, the CPU 201 reads program data (module data) from the flash ROM 211 into the DRAM 202 via the SATA I/F 205. The CPU 201 detects a copy instruction from the user onto the operation unit 102 via the panel I/F 206 according to the program (module) read into the DRAM 202. In response to the copy instruction being detected, the CPU 201 receives a document from the scanner unit 104 via the scanner I/F 208 as image data, and stores it into the DRAM 202. The CPU 201 performs, for example, color conversion processing suitable to the output on the image data stored in the DRAM 202.

The CPU 201 transfers the image data stored in the DRAM 202 to the printer unit 103 via the printer I/F 207, thus performing the print processing onto the paper medium.

In a case where page description language (PDL) printing is performed, the client PC 110 issues a print instruction via the LAN 120. The CPU 201 reads module data from the flash ROM 211 into the DRAM 202 via the SATA I/F 205, and detects the print instruction via the network I/F 204 according to the module read in the DRAM 202. In response to detecting a PDL transmission instruction, the CPU 201 receives print data via the network I/F 204, and stores the print data into the flash ROM 211 via the SATA I/F 205. In response to completing the storage of the print data, the CPU 201 develops the print data stored in the flash ROM 211 into the DRAM 202 as image data. The CPU 201 performs, for example, color conversion processing suitable to the output on the image data stored in the DRAM 202. The CPU 201 transfers the image data stored in the DRAM 202 to the printer unit 103 via the printer I/F 207, thus performing the print processing onto the paper medium.

In the following description, the functional configuration and the flow of the processing of updating the BIOS golden copy 403 according to the present exemplary embodiment will be described.

[Functional Configuration According to First Exemplary Embodiment]

FIG. 3 illustrates an example of the functional configuration implemented by the software that is executed by the controller unit 101 of the MFP 100. Among software programs executed by the controller unit 101, only embedded controller software 350 is executed by the embedded controller 212, and all the other software programs are executed by the CPU 201. The BIOS 360, a loader 370, an initial RAM disk (initrd) 380, a kernel 390, and controller software 300 are executed by the CPU 201.

The embedded controller 212 executes the embedded controller software 350. The embedded controller software 350 may be stored in any location from which the embedded controller 212 can read out the embedded controller software 350 to execute it. For example, the embedded controller software 350 may be stored in the ROM included in the embedded controller 212, or may be stored in the first SPI flash memory 213 or the second SPI flash memory 214.

Initially, the functions of the embedded controller software 350 will be described. The embedded controller software 350 includes a falsification detection unit 351, a restoration unit 352, a version comparison unit 353, a first update unit 354, and an unauthorized rewriting prevention unit 355.

The falsification detection unit 351 verifies whether the BIOS 360 is falsified using a first signature value 402 stored in the first SPI flash memory 213. The first signature value 402 will be described below with reference to FIG. 4. Examples employable as the signature verification method include a signature verification algorithm using the Rivest-Shamir-Adleman (RSA) public key cryptography and an Elliptic Curve Digital Signature Algorithm (ECDSA) signature verification algorithm using the elliptic-curve public key cryptography, which are known techniques. The public key used to verify the signature may be stored in the ROM included in the embedded controller 212 or may be stored in the first SPI flash memory 213 or the second SPI flash memory 214. The falsification detection unit 351 has also a function of verifying whether the BIOS golden copy 403 is falsified using a second signature value 405 stored in the second SPI flash memory 214. The second signature value 405 will be described below with reference to FIG. 4.

The restoration unit 352 has a function of restoring the BIOS 360 using the BIOS golden copy 403 stored in the second SPI flash memory 214 when the falsification detection unit 351 detects the falsification of the BIOS 360. As the restoration method, the restoration can be realized by, for example, deleting the BIOS 360 in the first SPI flash memory 213 and writing the BIOS golden copy 403 read out from the second SPI flash memory 214 into a vacated area. Since the BIOS golden copy 403 is copy data of the BIOS 360, the BIOS 360 can be restored into a normal state by overwriting the falsified BIOS 360 with the BIOS golden copy 403 in this manner. At this time, the first signature value 402 in the first SPI flash memory 213 is also overwritten with the second signature value 405 in the second SPI flash memory 214 in a similar manner.

Figure 4:
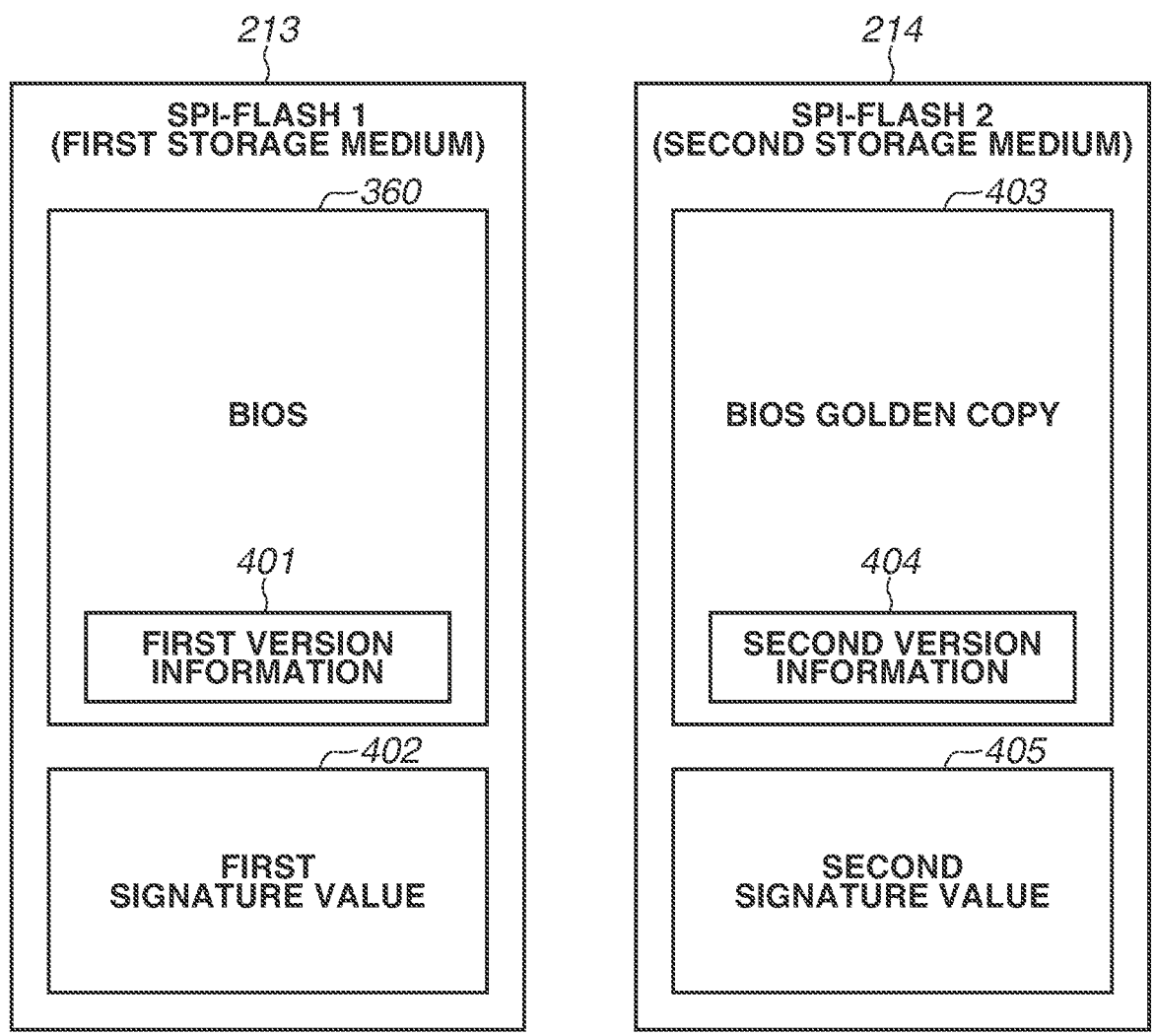
FIG. 4 illustrates an example of data stored in serial peripheral interface (SPI) flash memories.

The version comparison unit 353 compares first version information 401 and second version information 404 illustrated in FIG. 4. The first version information 401 is version information about the BIOS 360 stored in the first SPI flash memory 213. The second version information 404 is version information about the BIOS golden copy 403 stored in the second SPI flash memory 214. Commonly-used version information can be employed as the version information, and the version information can be expressed as, for example, an incremental value indicating a software update/release history in the chronological order. More specifically, if the current version information about the BIOS is "1.0", the version information about the BIOS updated or released for a bug, an addition of a function, a correction of vulnerability, or the like can be expressed as a numerical value incremented to "1.1". In this case, the comparison of the version information results in "1.1">"1.0", and thus the BIOS having the version information "1.1" can be determined to be a newer BIOS. The version comparison unit 353 can determine which version is newer, the BIOS 360 or the BIOS golden copy 403 by comparing the first version information 401 and the second version information 404. The above-described version information is merely an example, and may be a mixture of a numerical value and an alphabet. For example, the alphabetical order (the magnitude relationship of a<b<c< . . . <z) can also be used as the expression of the chronological update history by assigning "1.0a" to the current version and "1.0b" to the new version.

If the version comparison unit 353 determines that the BIOS 360 is a newer version than the BIOS golden copy 403, the first update unit 354 updates the BIOS golden copy 403 using the BIOS 360. As a specific update method, the update can be implemented by, for example, deleting the BIOS golden copy 403 in the second SPI flash memory 214 and writing the BIOS 360 read out from the first SPI flash memory 213 into an area vacated due to the deletion. The first update unit 354 overwrites the second signature value 405 in the second SPI flash memory 214 with the first signature value 402 in the first SPI flash memory 213, thus rewriting it into the signature value corresponding to the updated BIOS golden copy 403. Similarly, the second version information 404 in the second SPI flash memory 214 is also rewritten into the first version information 401 in the first SPI flash memory 213. In the present exemplary embodiment, the BIOS 360 includes the first version information 401 and the BIOS golden copy 403 includes the second version information 404 as illustrated in FIG. 4. Thus, the second version information 404 is also rewritten into the first version information 401 at the same time of the rewriting of the BIOS golden copy 403.

The unauthorized rewriting prevention unit 355 protects the BIOS golden copy 403 and the second signature value 405 from an unauthorized rewriting command targeting the second SPI flash memory 214. The protection is necessary because the normal restoration of the BIOS 360 becomes impossible if the BIOS golden copy 403 and the second signature value 405 are falsified according to the unauthorized rewriting command. The write protection (Write Protect) function provided to a SPI flash memory, which is a known technique, can be used as the protection method. Types of the write protection function include the software write protection function controllable on the software level and the hardware write protection function controllable only on the hardware level. With the protection based on the write protection set, all writing (Write) commands to the second SPI flash memory 214 are rejected on the second SPI flash memory 214 side, and the writing becomes impossible. In the case of the protection based on the software write protection function, commands for setting and removing the protection based on the write protection can be transmitted from the CPU 201 or the embedded controller 212 to the second SPI flash memory 214. On the other hand, in the case of the hardware write protection, the write protection cannot be set or removed unless a pin of the embedded controller 212 is physically operated. In the present exemplary embodiment, the unauthorized rewriting prevention unit 355 achieves both the update and the protection of the BIOS golden copy 403 by transmitting the commands for setting and removing the write protection to the second SPI flash memory 214 based on the software write protection function. More specifically, the unauthorized rewriting prevention unit 355 removes the write protection of the second SPI flash memory 214 only at the time of the update by the first update unit 354, and sets the write protection of the second SPI flash memory 214 again after the completion of the update. Thus, the second SPI flash memory 214 is kept in a protected state with the aid of the write protection except during the update.

After the completion of the processing of the above-described function, the embedded controller software 350 transmits the reset signal to the CPU 201 to transfer the control to the CPU 201, and enters the sleep state.

Next, the functions that are performed by the CPU 201 will be described. The CPU 201 executes the BIOS 360 stored in the first SPI flash memory 213. The CPU 201 executes the loader 370, the initrd 380, and the controller software 300 stored in the flash ROM 211 after reading them into the DRAM 202. The BIOS 360 performs basic processing that allows the CPU 201 to control the I/O controller 203 and the DRAM 202. Further, the BIOS 360 includes processing of reading in the loader 370 from the flash ROM 211 and starting it. The loader 370 performs processing of reading the kernel 390 and the initrd 380 of the OS based on a startup mode, which will be described below, from the flash ROM 211, and starting them. The initrd 380 performs processing of reading the controller software 300 from the flash ROM 211 and starting it.

The controller software 300 includes an operation control unit 301, a data storage unit 302, a job control unit 303, an image processing unit 304, a print processing unit 305, and a reading processing unit 306. The controller software 300 further includes a network control unit 307, a Transmission Control Protocol/Internet Protocol (TCP/IP) control unit 308, a USB control unit 309, and a second update unit 310.

The operation control unit 301 displays a screen image for the user on the operation unit 102, and detects a user operation and performs processing associated with a screen component, such as a button displayed on the screen. The data storage unit 302 stores data in the flash ROM 211 and reads the data therefrom according to a request from another control unit. For example, when the user wants to change some device setting, the operation control unit 301 detects the description that the user input onto the operation unit 102, and the data storage unit 302 stores the description into the flash ROM 211 as a setting value in response to a request from the operation control unit 301.

The job control unit 303 controls job execution according to an instruction from another control unit. The image processing unit 304 processes image data into a format suitable for each intended use according to an instruction from the job control unit 303. The print processing unit 305 prints an image onto a paper medium via the printer I/F 207 according to an instruction from the job control unit 303. The reading processing unit 306 reads a set document via the scanner I/F 208 according to an instruction from the job control unit 303.

The network control unit 307 makes a network setting, such as an IP address, on the TCP/IP control unit 308 when the system is started up or when a setting change is detected according to a setting value stored in the data storage unit 302. The TCP/IP control unit 308 performs processing of transmitting and receiving a network packet via the network I/F 204 according to an instruction from another control unit. The USB control unit 309 controls the USB I/F 209, thus controlling any device connected via USB.

The second update unit 310 updates the BIOS 360 stored in the first SPI flash memory 213. As a specific update method, this update can be realized by, for example, overwriting the BIOS 360 in the first SPI flash memory 213 with a BIOS for the update acquired via a network or via a USB memory. Similarly, the first version information 401 and the first signature value 402 in the first SPI flash memory 213 are also updated using version information and a signature value of the BIOS for the update that are associated with the BIOS for the update. After the completion of the processing of updating the BIOS 360, the second update unit 310 requests a restart to update the BIOS golden copy 403 by the above-described first update unit 354.

FIG. 4 illustrates an example of the data stored in the first SPI flash memory 213, which is the first storage medium, and the second SPI flash memory 214, which is the second storage medium. The first SPI flash memory 213, which is accessible by the CPU 201 and the embedded controller 212, stores the BIOS 360, the first version information 401, and the first signature value 402 therein. The version information about the BIOS 360 will be described to have the structure in which the version information is included in the BIOS 360 as the first version information 401 in the present exemplary embodiment, but this is merely an example. As will be described below in an exemplary modification, the first version information 401 may be stored in the first SPI flash memory 213 separately from the BIOS 360 without being included in the BIOS 360. The first signature value 402 is a digital signature value regarding the BIOS 360, and is used for the falsification detection unit 351 to verify whether the BIOS 360 is falsified as described above. As illustrated in FIG. 4, the inclusion of the first version information 401 inside the BIOS 360 allows the first signature value 402 to serve as a signature value for the entire binary data of the BIOS 360 including the first version information 401. Thus, the falsification detection unit 351 can also verify whether the first version information 401 included in the BIOS 360 is falsified by verifying whether the BIOS 360 is falsified.

On the other hand, the second SPI flash memory 214, which is accessible only by the embedded controller 212, stores the BIOS golden copy 403, the second version information 404, and the second signature value 405 therein. In the present exemplary embodiment, the version information about the BIOS golden copy 403 will be described to be included in the BIOS golden copy 403 as the second version information 404, as in the above description. Similarly, the second signature value 405 serves as a digital signature value of the entire BIOS golden copy 403 including the second version information 404. Here, the BIOS golden copy 403 is binary data used for the restoration unit 352 to restore the BIOS 360 into a normal state as described above. The BIOS golden copy 403, the second version information 404, and the second signature value 405 are the same binary data as the BIOS 360, the first version information 401, and the first signature value 402 in the first SPI flash memory 213, respectively. Normally, they are the same binary data as described above except during a startup immediately after falsification, a data loss, or a BIOS update. [Processing Flow according to First Exemplary Embodiment]

Figure 5A:
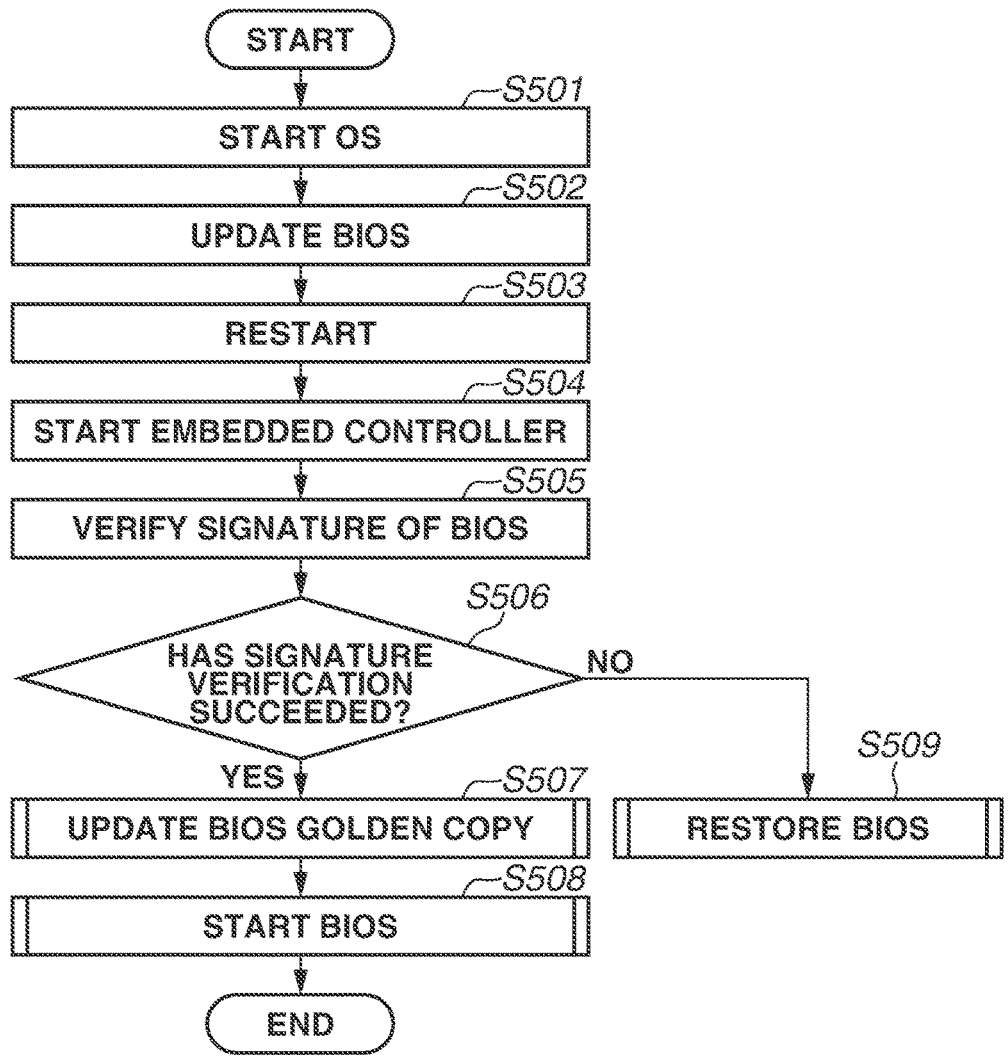
FIGS. 5A to 5D are flowcharts illustrating an information processing method.

FIG. 5A is a flowchart illustrating an information processing method of the MFP 100, and illustrates the processing of updating the BIOS golden copy 403. In step S501, after the power switch of the MFP 100 is pressed, the embedded controller 212 initially starts the embedded controller software 350. After that, the CPU 201 starts the BIOS 360, the loader 370, the initrd 380, and the kernel 390, and starts the OS.

In step S502, after the OS is started, the second update unit 310 acquires the latest BIOS via the network or the like, and updates the BIOS 360. In step S503, the second update unit 310 restarts the MFP 100. In step S504, after the restart, the embedded controller 212 is started.

In step S505, the falsification detection unit 351 detects whether the BIOS 360 is falsified based on the signature verification, using the first signature value 402. In step S506, if the signature verification has succeeded (YES in step S506), the falsification detection unit 351 determines that no falsification of the BIOS 360 is detected. The processing then proceeds to step S507. If the signature verification has failed (NO in step S506), the falsification detection unit 351 determines that a falsification of the BIOS 360 is detected. The processing then proceeds to step S509.

In step S507, the MFP 100 performs the processing of updating the BIOS golden copy 403. The processing then proceeds to step S508. The details of the operation in step S507 will be described below with reference to FIG. 5B.

In step S508, the MFP 100 performs the BIOS start processing. The processing of the flowchart in FIG. 5A is ended. The details of the operation in step S508 will be described below with reference to FIG. 5C.

In step S509, the MFP 100 performs the BIOS restoration processing. The details of the operation in step S509 will be described below with reference to FIG. 5D.

Figure 5B:
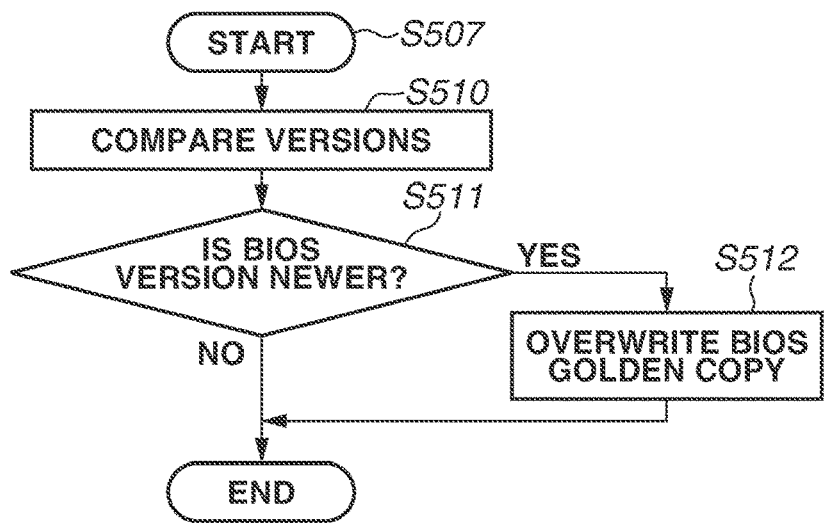

FIG. 5B is a flowchart illustrating the details of the operation in step S507 illustrated in FIG. 5A. In step S510, the version comparison unit 353 compares the first version information 401 and the second version information 404.

In step S511, if the version comparison unit 353 determines that the first version information 401 is newer than the second version information 404 (YES in step S511), the processing proceeds to step S512. If the first version information 401 is not newer than the second version information 404 (NO in step S511), the version comparison unit 353 determines that the BIOS golden copy 403 does not have to be updated, and the processing of the flowchart in FIG. 5B is ended.

In step S512, the first update unit 354 updates the BIOS golden copy 403 by overwriting the BIOS golden copy 403 with the BIOS 360. The processing of the flowchart in FIG. 5B is then ended.

Figure 5C:
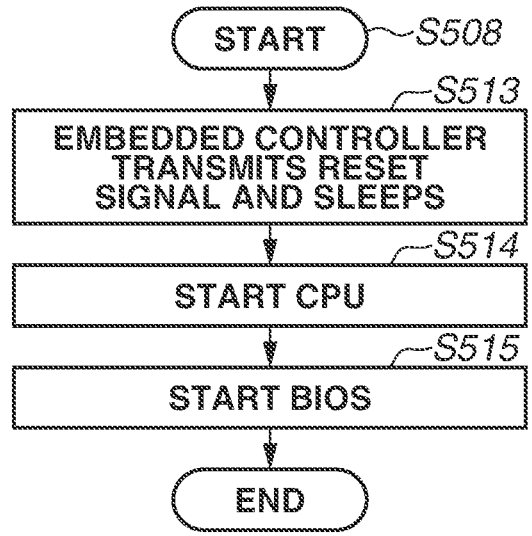

FIG. 5C is a flowchart illustrating the details of the operation in step S508 illustrated in FIG. 5A. In step S513, the embedded controller 212 transmits the reset signal to the CPU 201 to transfer the control to the CPU 201, and the embedded controller 212 enters the sleep state.

In step S514, the CPU 201 receives the reset signal, and is started. In step S515, the CPU 201 reads out the BIOS 360 in the first SPI flash memory 213 and starts the BIOS 360. The processing of the flowchart in FIG. 5C is then ended.

Figure 5D:
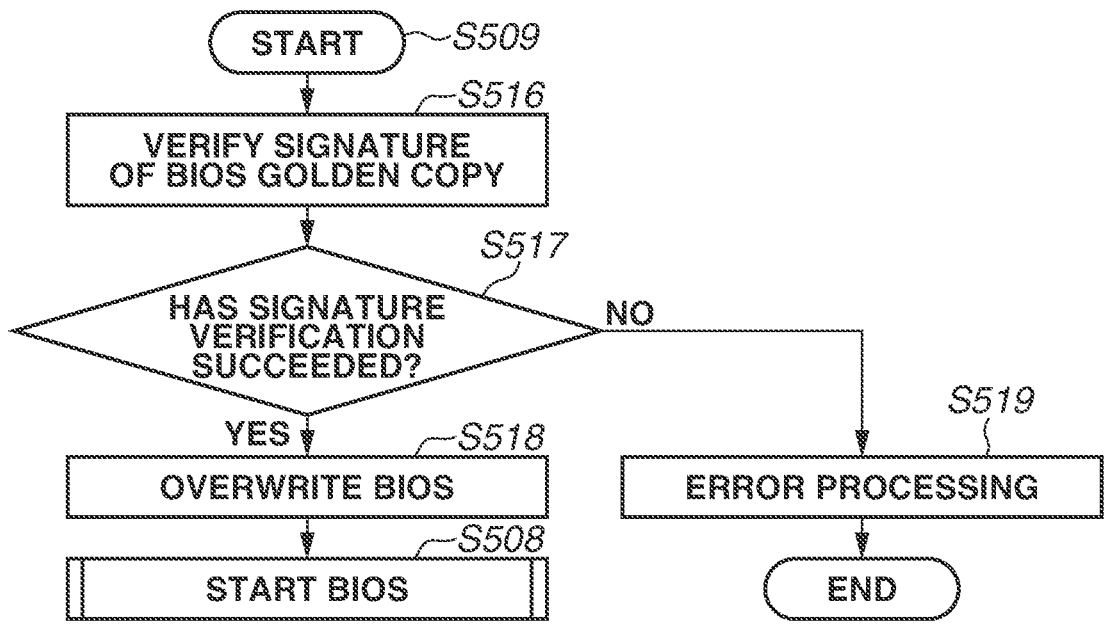

FIG. 5D is a flowchart illustrating the details of the operation in step S509 illustrated in FIG. 5A. In step S516, the falsification detection unit 351 detects whether the BIOS golden copy 403 in the second SPI flash memory 214 is falsified based on the signature verification using the second signature value 405.

In step S517, the falsification detection unit 351 determines that the BIOS golden copy 403 is not falsified if the signature verification has succeeded (YES in step S517). The processing then proceeds to step S518. The falsification detection unit 351 determines that the BIOS golden copy 403 is falsified if the signature verification has failed (NO in step S516). The processing then proceeds to step S519.

In step S518, the restoration unit 352 restores the falsified BIOS 360 by overwriting the falsified BIOS 360 with the BIOS golden copy 403. The processing then proceeds to step S508 illustrated in FIG. 5A.

In step S519, the restoration unit 352 performs error processing without performing the processing of restoring the BIOS 360. The processing is then ended. The restoration unit 352 may notify the user of the occurrence of the error by recording a log, issuing an error notification via the operation unit 102, blinking a light emitting diode (LED) or a power light provided to the MFP 100 and the embedded controller 212, or the like, as the error processing.

If the second update unit 310 does not update the BIOS 360 in step S502, the first version information 401 of the BIOS 360 and the second version information 404 of the BIOS golden copy 403 keep matching each other. Thus, if the BIOS 360 is not updated, in step S511, the version comparison unit 353 determines that the first version information 401 is not newer than the second version information 404 (the processing proceeds to "NO" from step S511). In this case, the BIOS golden copy 403 is not updated.

In this manner, the BIOS golden copy 403 is stored in the second SPI flash memory 214, which is not accessible from the CPU 201. Even in such a case, the MFP 100 can update the BIOS golden copy 403 to the latest version by utilizing the first version information 401 and the second version information 404.

The MFP 100 can achieve both the prevention of falsification of the BIOS golden copy 403 (including prevention of an unauthorized rollback), and the secure update of the BIOS golden copy 403.

First Exemplary Modification

In the first exemplary embodiment, the MFP 100 performs the processing of restoring the BIOS 360 in step S509 only in a case where the falsification detection unit 351 detects the falsification of the BIOS 360. In a first exemplary modification, the MFP 100 also performs the processing of restoring the BIOS 360 in step S509 in a case where the second version information 404 is newer than the first version information 401.

The MFP 100 can determine that the BIOS 360 is rolled back to the BIOS 360 in an old version if the second version information 404 is newer than the first version information 401. Even in a case where the BIOS 360 itself is not falsified, known vulnerability may remain if the BIOS 360 is kept in the old version, and thus the MFP 100 overwrites the BIOS 360 with the BIOS golden copy 403, which is a newer version than that.

Figure 6A:
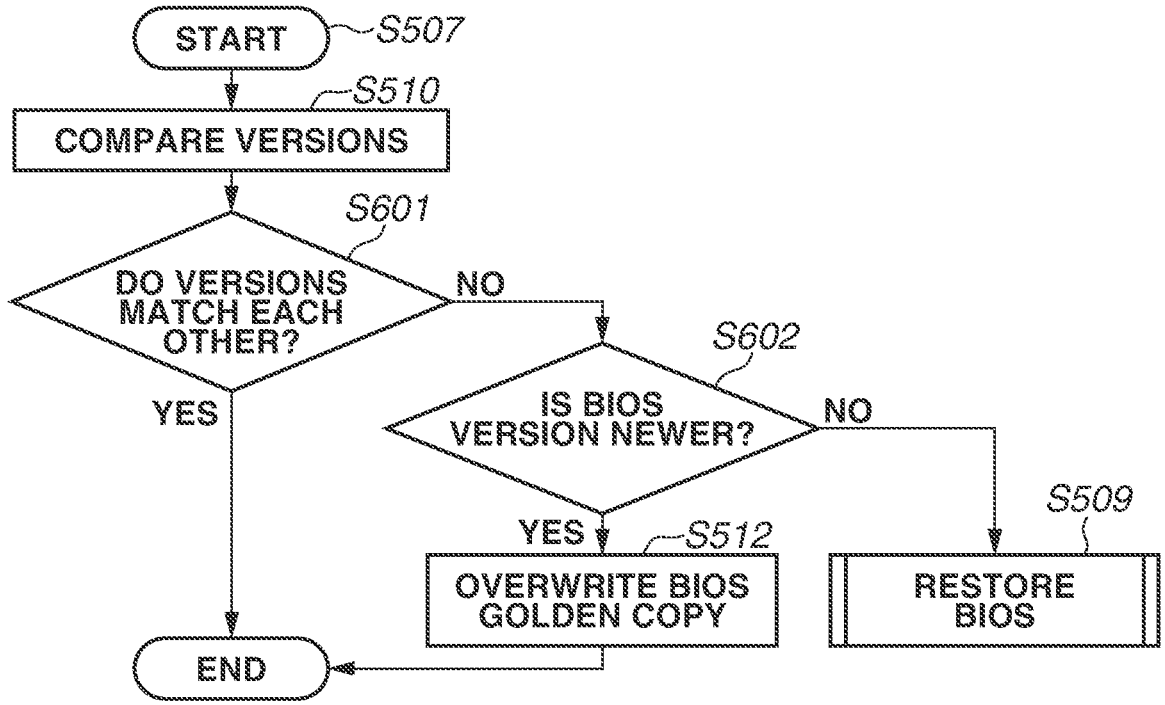
FIGS. 6A and 6B are flowcharts illustrating an information processing method.

FIG. 6A is a flowchart illustrating the details of the operation in step S507 in FIG. 5A according to the first exemplary modification. In the following description, differences of the first exemplary modification (FIG. 6A) from the first exemplary embodiment (FIG. 5B) will be described.

In step S510, the version comparison unit 353 compares the first version information 401 and the second version information 404. If the version comparison unit 353 determines that the first version information 401 and the second version information 404 match each other in step S601 (YES in step S601), the processing illustrated in FIG. 6A is ended. If the version comparison unit 353 determines that the first version information 401 and the second version information 404 do not match each other (NO in step S601), the processing proceeds to step S602.

In step S602, the version comparison unit 353 determines whether the first version information 401 is newer than the second version information 404. If the version comparison unit 353 determines that the first version information 401 is newer than the second version information 404 (YES in step S602), the processing proceeds to step S512. If the version comparison unit 353 determines that the first version information 401 is older than the second version information 404 (NO in step S602), the processing proceeds to step S509.

In step S512, the first update unit 354 updates the BIOS golden copy 403 by overwriting the BIOS golden copy 403 with the BIOS 360. The processing of the flowchart in FIG. 6A is ended. In step S509, the MFP 100 performs the BIOS restoration processing in a manner similar to the processing in FIG. 5D.

In this manner, the MFP 100 restores the BIOS 360 in the version outdated due to a rollback, using the BIOS golden copy 403 in a newer version even in a case where the BIOS 360 itself is not falsified. Thus, the MFP 100 can be started up with the BIOS in a new version, in which the known vulnerability is presumably further reduced.

Second Exemplary Modification

In a second exemplary modification, the MFP 100 prevents unauthorized rewriting (a write command) targeting the BIOS golden copy 403 by setting or removing the write protection for the BIOS golden copy 403 as necessary via the unauthorized rewriting prevention unit 355. The write protection is set to the BIOS golden copy 403 in the second SPI flash memory 214.

Figure 6B:
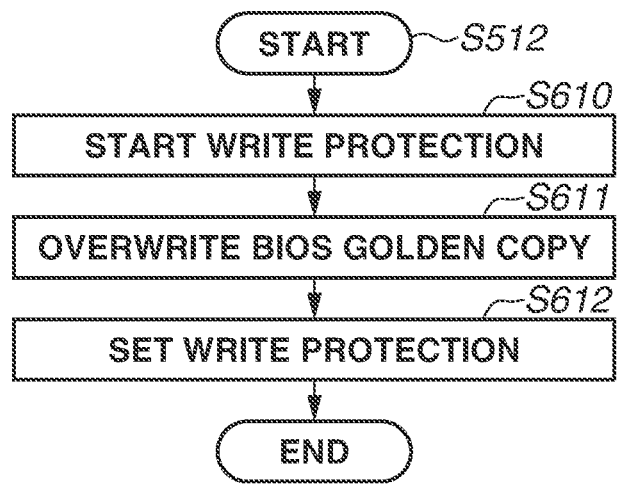

FIG. 6B is a flowchart illustrating the details of the operation in step S512 in FIGS. 5B and 6A according to the second exemplary modification. In the following description, differences of the second exemplary modification from the first exemplary embodiment and the first exemplary modification will be described.

In step S610, the unauthorized rewriting prevention unit 355 removes the write protection of the BIOS golden copy 403. After that, in step S611, the first update unit 354 updates the BIOS golden copy 403 by overwriting the BIOS golden copy 403 with the BIOS 360. After that, in step S612, the unauthorized rewriting prevention unit 355 sets the write protection of the BIOS golden copy 403. The processing of the flowchart in FIG. 6B is then ended.

Meanwhile, the write protection of the BIOS golden copy 403 should be set first somewhere. The write protection of the BIOS golden copy 403 may be set at a factory when the MFP 100 is shipped from the factory, or the unauthorized rewriting prevention unit 355 may be configured to set the write protection of the BIOS golden copy 403 when the MFP 100 is started up for the first time.

Besides that, the unauthorized rewriting prevention unit 355 can determine the set or removed state of the write protection of the BIOS golden copy 403 by referring to the state of a resister included in the second SPI flash memory 214. In a case where the write protection of the BIOS golden copy 403 is removed, the unauthorized rewriting prevention unit 355 performs dynamic control so as to set the write protection of the BIOS golden copy 403. As a result, the write protection can be set to the first BIOS golden copy 403. The second exemplary modification has been described based on the example in which the unauthorized rewriting prevention unit 355 sets the write protection only to the BIOS golden copy 403, but this is merely an example and the write protection may be set to the entire second SPI flash memory 214.

As described above, the MFP 100 sets or removes the write protection, which is a function of the SPI flash memory, as necessary, thus achieving both the protection and the update of the BIOS golden copy 403.

Third Exemplary Modification

The data structures in the first SPI flash memory 213 and the second SPI flash memory 214 have been described as the structures illustrated in FIG. 4 in the above-descried first exemplary embodiment and first and second exemplary modifications, but they are merely examples and the first SPI flash memory 213 and the second SPI flash memory 214 may have different data structures. Other data structure examples will be described with reference to FIGS. 7A and 7B, and 8A and 8B.

FIG. 7A illustrates an example of the data stored in the first SPI flash memory 213 and the second SPI flash memory 214. The first SPI flash memory 213 stores therein a first version information signature value 701 as a signature value of the first version information 401 in addition to the BIOS 360, the first version information 401, and the first signature value 402.

The BIOS 360 includes the first version information 401 and the first version information signature value 701. The falsification detection unit 351 can verify whether the first version information 401 is falsified by conducting the signature verification using the first version information signature value 701.

The second SPI flash memory 214 stores therein a second version information signature value 702 as a signature value of the second version information 404 in addition to the BIOS golden copy 403, the second version information 404, and the second signature value 405. The BIOS golden copy 403 includes the second version information 404 and the second version information signature value 702. The falsification detection unit 351 can verify whether the second version information 404 is falsified by conducting the signature verification using the second version information signature value 702.

FIG. 7B illustrates an example of other data stored in the first SPI flash memory 213 and the second SPI flash memory 214. The first SPI flash memory 213 stores the BIOS 360, the first version information 401, the first version information signature value 701, and the first signature value 402 individually separately therein. The second SPI flash memory 214 stores the BIOS golden copy 403, the second version information 404, the second version information signature value 702, and the second signature value 405 individually separately therein.

The first signature value 402 is a signature value for the BIOS 360 alone. The second signature value 405 is a signature value for the BIOS golden copy 403 alone.

Figure 8A:
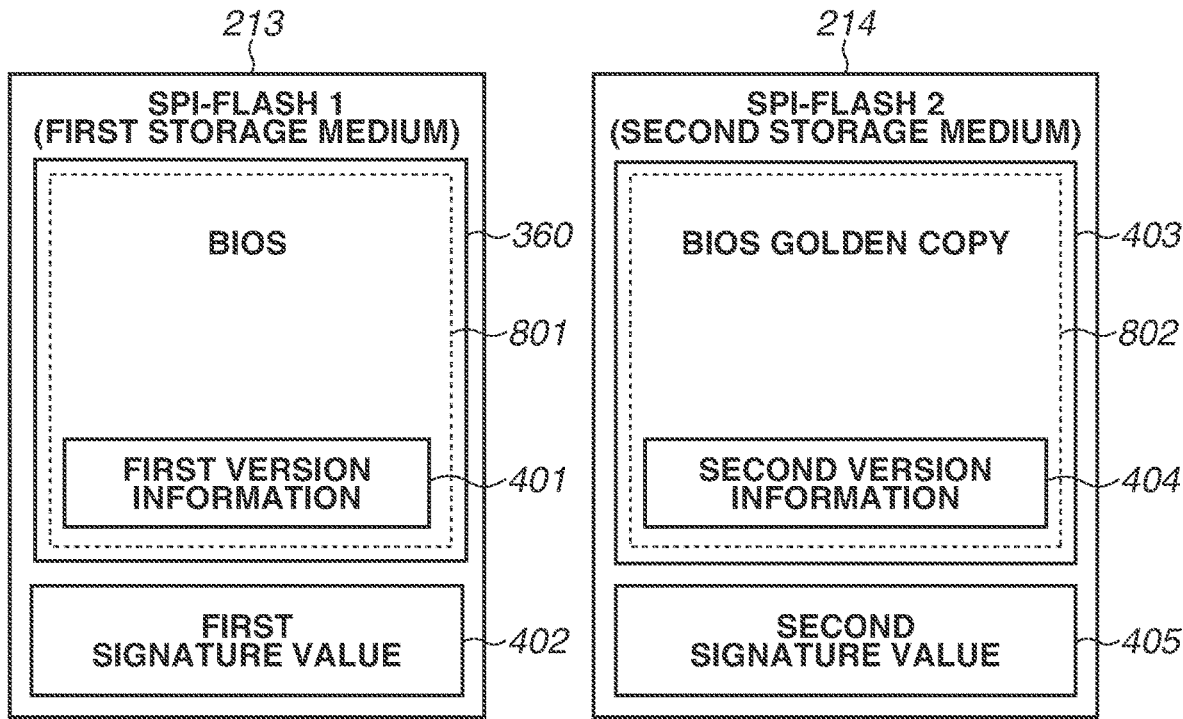
FIGS. 8A and 8B illustrate examples of the data stored in the SPI flash memories.

FIG. 8A illustrates an example of other data stored in the first SPI flash memory 213 and the second SPI flash memory 214. The first SPI flash memory 213 stores the BIOS 360 therein. The BIOS 360 includes the first version information 401 and the first signature value 402. The first signature value 402 is a digital signature value for a partial area 801 in the binary data of the BIOS 360 that excludes the first signature value 402 itself. In other words, the first signature value 402 is a signature value for binary data including the first version information 401 and an actual code area of the BIOS 360 (partial binary data of the BIOS 360 that excludes the first version information 401 and the first signature value 402).

The second SPI flash memory 214 stores the BIOS golden copy 403 therein. The BIOS golden copy 403 includes the second version information 404 and the second signature value 405. The second signature value 405 is a digital signature value for a partial area 802 in the binary data of the BIOS golden copy 403 that excludes the second signature value 405 itself.

In other words, the second signature value 405 is a signature value for binary data including the second version information 404 and an actual code area of the BIOS golden copy 403. The binary data including the actual code area of the BIOS golden copy 403 is partial binary data of the BIOS golden copy 403 that excludes the second version information 404 and the second signature value 405.

In this manner, the BIOS 360 includes not only the first version information 401 but also the first signature value 402 in a vacant area. The BIOS golden copy 403 includes not only the second version information 404 but also the second signature value 405 in a vacant area. As a result, the MFP 100 can achieve both the capacity saving and the detection of falsification based on the signature verification with respect to the first SPI flash memory 213 and the second SPI flash memory 214.

Figure 8B:
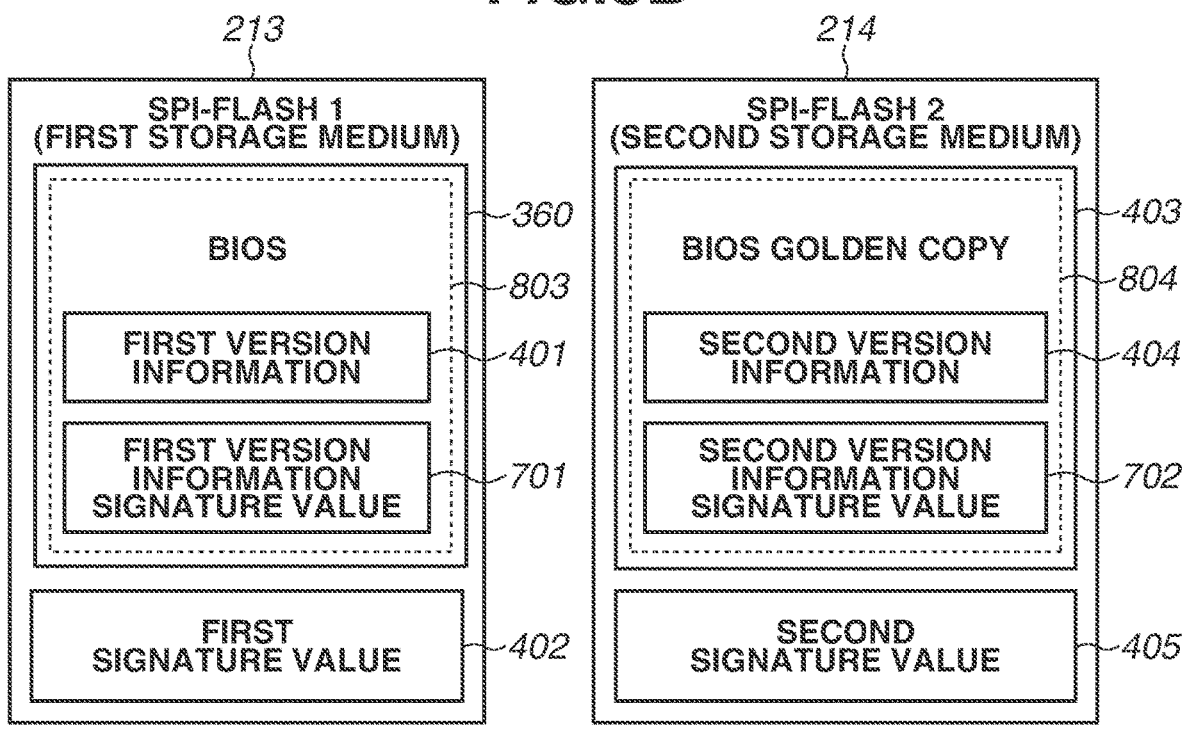

FIG. 8B illustrates an example of other data stored in the first SPI flash memory 213 and the second SPI flash memory 214. The first SPI flash memory 213 stores the BIOS 360 therein. The BIOS 360 includes the first version information 401, the first version information signature value 701, and the first signature value 402. The falsification detection unit 351 can verify whether the first version information 401 is falsified by conducting the signature verification using the first version information signature value 701. The BIOS 360 includes the first version information 401, the first version information signature value 701, and the first signature value 402 in a vacant area, thus achieving the saving of the capacity of the first SPI flash memory 213. The first signature value 402 is a digital signature value for a partial area 803 in the binary data of the BIOS 360 that excludes the first signature value 402 itself.

The second SPI flash memory 214 stores the BIOS golden copy 403 therein. The BIOS golden copy 403 includes the second version information 404, the second version information signature value 702, and the second signature value 405. The falsification detection unit 351 can verify whether the second version information 404 is falsified by conducting the signature verification using the second version information signature value 702. The BIOS golden copy 403 includes the second version information 404, the second version information signature value 702, and the second signature value 405 in a vacant area, thus achieving the saving of the capacity of the second SPI flash memory 214. The second signature value 405 is a digital signature value for a partial area 804 in the binary data of the BIOS golden copy 403 that excludes the second signature value 405 itself.

Other Exemplary Modifications

In the above-described first exemplary embodiment and first to third exemplary modifications, the falsification detection unit 351 conducts the signature verification of the BIOS golden copy 403 to verify whether the BIOS golden copy 403 is falsified. At this time, the falsification detection unit 351 may be configured to determine that the possibility that the BIOS golden copy 403 is falsified is infinitesimally low, and may omit to conduct the signature verification of the BIOS golden copy 403. The BIOS golden copy 403 is stored in the second SPI flash memory 214, which is inaccessible from the CPU 201, and therefore can be deemed to have a low risk of being attacked (falsified). As a result, the MFP 100 can cut off the time taken for the signature verification of the BIOS golden copy 403.

In the above-described first exemplary embodiment and first to third exemplary modifications, the MFP 100 performs the processing of updating the BIOS golden copy 403 in step S507 after the signature verification in step S506 has succeeded. However, the timing of the processing of updating the BIOS golden copy 403 is not limited to this example. For example, the MFP 100 may be configured to perform the processing of updating the BIOS golden copy 403 in step S507 after step S504 and before step S505. The MFP 100 may also be configured to perform only the processing of updating the BIOS golden copy 403 in step S507 without performing the operations in steps S505 and S506. Further alternatively, the MFP 100 can perform the processing of updating the BIOS golden copy 403 in step S507 after step S513. For example, in the MFP 100, the embedded controller 212 is waken up from the sleep state by the CPU 201 transmitting an interruption command to the embedded controller 212 at any timing. The update of the BIOS golden copy 403 can be realized by the waken embedded controller 212 performing the processing of updating the BIOS golden copy 403 in step S507.

In the above-described first exemplary embodiment and first to third exemplary modifications, the first update unit 354 performs the processing of updating the BIOS golden copy 403 in step S512 only in a case where the first version information 401 is newer than the second version information 404. However, the first update unit 354 may be configured to always perform the processing of updating the BIOS golden copy 403 in step S512 in a case where the first version information 401 and the second version information 404 fail to match each other. In other words, the first update unit 354 can update the BIOS golden copy 403 using the BIOS 360 according to a result of the comparison between the first version information 401 and the second version information 404.

The above-described first exemplary embodiment and first to third exemplary modifications have been described citing the BIOS as an example, but can also be applied to firmware different from the BIOS and software (a program). For example, in a case where the MFP 100 includes an NIC, the bus is connected so as to allow the embedded controller 212 to access the firmware of the NIC. The MFP 100 is configured in such a manner that a golden copy of the NIC firmware is stored in the second SPI flash memory 214 accessible only from the embedded controller 212. This configuration enables the implementation of restoration of the NIC firmware and an update of the golden copy of the NIC firmware.

The above-described first exemplary embodiment and first to third exemplary modifications have been described based on the example in which the embedded controller 212 directly starts the embedded controller software 350, but may be configured in such a manner that the embedded controller software 350 is started in a stepwise manner. The stepwise start can be realized by, for example, storing, in the ROM of the embedded controller 212, software for the start that detects falsification of the embedded controller software 350 (the signature verification) and starts the embedded controller software 350. The software for the start that is stored in the ROM of the embedded controller 212 is launched first, and verifies whether the embedded controller software 350 stored in the first SPI flash memory 213 or the second SPI flash memory 214 is falsified. The software for the start can perform control so as to start the embedded controller software 350 unless the embedded controller software 350 is falsified. In this case, a digital signature value of the embedded controller software 350 is supposed to be additionally stored in the first SPI flash memory 213 or the second SPI flash memory 214.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Any of the above-described exemplary embodiments merely indicates a specific example when an embodiment of the present disclosure is implemented, and the technical scope of the present disclosure shall not be construed limitedly by them. In other words, embodiments of the present disclosure can be implemented in various manners without departing from the technical idea thereof or the main features thereof.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-181103, filed Oct. 29, 2020, which is hereby incorporated by reference herein in its entirety.

What is claimed is:

1. An information processing apparatus storing first software and second software, the first software being stored in a first storage medium accessible by a central processing unit and an embedded controller, the second software being used to restore the first software and stored in a second storage medium accessible only by the embedded controller, the information processing apparatus comprising:
   an update unit configured to update the second software in the second storage medium using the first software in the first storage medium depending on a result of a comparison between version information about the first software and version information about the second software, by using the embedded controller;
   a falsification detection unit configured to detect whether the first software is falsified; and
   a restoration unit configured to restore the first software using the second software in a case where the falsification detection unit detects that the first software is falsified.

2. The information processing apparatus according to claim 1,
   wherein the embedded controller includes the update unit, the falsification detection unit, and the restoration unit, and
   wherein the central processing unit starts the first software after the restoration performed by the restoration unit.

3. The information processing apparatus according to claim 1, wherein the update unit updates the second software in the second storage medium using the first software in the first storage medium depending on the result of the comparison between the version information about the first software and the version information about the second software in a case where the falsification detection unit detects that the first software is not falsified.

4. The information processing apparatus according to claim 3,
   wherein the embedded controller includes the update unit, the falsification detection unit, and the restoration unit, and
   wherein the CPU starts the first software after the update by the update unit.

5. The information processing apparatus according to claim 1, wherein the update unit updates the second software in the second storage medium using the first software in the first storage medium depending on the result of the comparison between the version information about the first software and the version information about the second software before the detection by the falsification detection unit and the restoration by the restoration unit.

6. The information processing apparatus according to claim 5, wherein the embedded controller includes the update unit, the falsification detection unit, and the restoration unit, and wherein the central processing unit starts the first software in a case where the falsification detection unit detects that the first software is not falsified.

7. The information processing apparatus according to claim 1, wherein the update unit updates the second software in the second storage medium using the first software in the first storage medium in a case where the version information about the first software is newer than the version information about the second software.

8. The information processing apparatus according to claim 7, wherein the restoration unit restores the first software using the second software in a case where the version information about the first software is older than the version information about the second software.

9. The information processing apparatus according to claim 1, wherein the update unit updates the second software in the second storage medium using the first software in the first storage medium in a case where the version information about the first software and the version information about the second software do not match each other.

10. The information processing apparatus according to claim 1, wherein the embedded controller includes the update unit, the falsification detection unit, and the restoration unit, and wherein the central processing unit includes a second update unit different from the update unit, the second update unit configured to update the first software in the first storage medium before the update by the update unit, the detection by the falsification detection unit, and the restoration by the restoration unit.

11. The information processing apparatus according to claim 1, wherein the falsification detection unit detects whether the second software is falsified, and wherein the restoration unit restores the first software using the second software in a case where the falsification detection unit detects that the first software is falsified and the falsification detection unit detects that the second software is not falsified.

12. The information processing apparatus according to claim 1, wherein write protection is set to the second software in the second storage medium, and wherein the information processing apparatus further includes a rewriting prevention unit configured to remove the write protection of the second software before the update by the update unit and set the write protection of the second software after the update by the update unit.

13. The information processing apparatus according to claim 1, further comprising a printer unit configured to perform printing.

14. An information processing method for an information processing apparatus storing first software and second software, the first software being stored in a first storage medium accessible by a central processing unit and an embedded controller, the second software being used to restore the first software and stored in a second storage medium accessible only by the embedded controller, the method comprising:

updating the second software in the second storage medium using the first software in the first storage medium depending on a result of a comparison between version information about the first software and version information about the second software, by using the embedded controller;

detecting whether the first software is falsified; and restoring the first software using the second software in a case where a falsification of the first software is detected in the detecting.

15. A non-transitory storage medium storing a program causing a computer to execute an information processing method for an information processing apparatus storing first software and second software, the first software being stored in a first storage medium accessible by a central processing unit and an embedded controller, the second software being used to restore the first software and stored in a second storage medium accessible only by the embedded controller, the method comprising:

updating the second software in the second storage medium using the first software in the first storage medium depending on a result of a comparison between version information about the first software and version information about the second software, by using the embedded controller;

detecting whether the first software is falsified; and restoring the first software using the second software in a case where a falsification of the first software is detected in the detecting.

* * * * *